Figure 1:
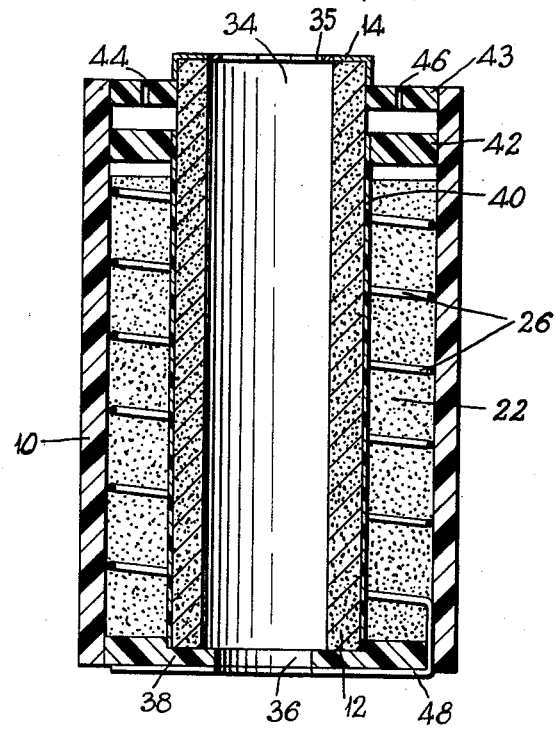

May 24, 1960  K. KORDESCH  2,938,064
AIR-DEPOLARIZED CELL
Filed March 12, 1958

INVENTOR.
KARL KORDESCH
BY
ATTORNEY

United States Patent Office 2,938,064
Patented May 24, 1960

2,938,064
AIR-DEPOLARIZED CELL

Karl Kordesch, Lakewood, Ohio, assignor to Union Carbide Corporation, a corporation of New York Filed Mar. 12, 1958, Ser. No. 721,030

9 Claims. (Cl. 136—86)

This invention relates to an air-depolarized cell employing an alkaline electrolyte in conjunction with a gelled anode.

The main object of this invention is to provide an air-depolarized cell operable at good currents, and satisfactory voltages, at temperatures as low as —20° C.

Another object of the invention is to provide a novel anode collector.

In the drawings:

Fig. 1 is a vertical section of a cell in accord with the invention; and

Figure 2:
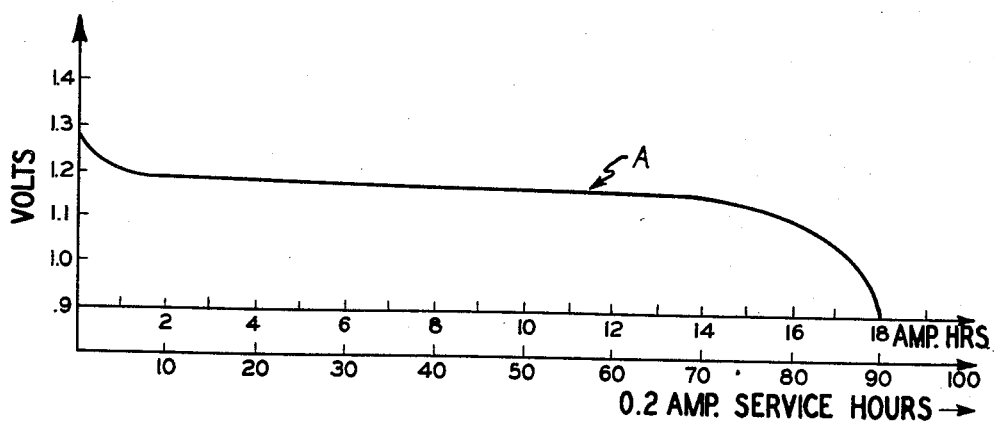

Fig. 2 contains a series of curves showing the performance of such a cell.

The cell of the invention comprises a centrally apertured container, an anode gel mixed with electrolyte, and a separator-lined cathode protruding above the container. This cathode is treated, prior to cell assembly, by one of the processes disclosed in U.S. Patents 2,615,932 and 2,669,598 issued to A. Marko and K. Kordesch.

The processes claimed in the mentioned patents involve impregnating porous carbon with a solution containing at least one heat decomposable salt of a heavy metal such as iron, cobalt, nickel, manganese, chromium, copper, silver, gold, platinum, vanadium, titanium, uranium, thorium and the rare earths, and at least one heat decomposable salt of aluminum, the enumerated salts acting as oxidizing agents for carbon. Following impregnation with above-described solution, the treated carbons are heated to decompose the salts, thereby activating and catalyzing them. Following this treatment, the carbon contains within its pores and at the surface thereof a spinel type catalyst consisting of an oxide of the heavy metal and of aluminum oxide ($RO \cdot Al_2O_3$). This treatment will be more fully described hereinafter.

*Cathode fabrication*

The cathodes used in the cells of the invention may be prepared from a mixture consisting of about 60 percent by weight of projector type carbon, about 40 percent by weight of soft pitch and about 1½ percent by weight of fuel oil. Tubes having the desired dimensions are extruded from such a mix and baked at 1000° C. for about 6 hours. After this baking the tubes have a porosity of between 20 and 33 percent, using water saturation method measurements. The tubes are next heated in a $CO_2$ atmosphere between 850° C. and 950° C. for two hours to convert their hard and shiny skin to a surface having a dark black appearance. In this condition the carbon tubes are better able to absorb the catalyzing solution in which they will be immersed. Such a solution may consist of an 0.1 molar solution of aluminum nitrate and cobalt nitrate containing 75 g. $Al(NO_3)_3 \cdot 9H_2O$ and 29 g. $Co(NO_3)_2 \cdot 6H_2O$ per liter. Generally one carbon cathode requires about 3 ml. of solution. Best results have been obtained by placing the carbon dioxide-treated carbon tubes, once cooled, in a container which is then evacuated. After obtaining a vacuum of about 20 millimeters of mercury, the catalyzing solution is allowed to enter the container, and to soak the electrodes. Upon restoring the air pressure, the solution is pressed into the pores of the tubes. The tubes are then dried at 100° C. for two hours, and heated again to 850° C. for two hours in carbon dioxide to decompose the metal nitrates to oxides. After this treatment a spinel of the formula $CoO \cdot Al_2O_3$ is formed from the catalyst mixture. The deposit is observable on the surface of the carbon tubes as a blue deposit. After cooling the carbon tubes in a carbon dioxide atmosphere, the vacuum operation and heating cycles are repeated to increase the activity of the carbon surface. A third cycle of treatment is not necessary, except for high current electrodes of a capacity of 100 milliamperes per centimeter squared, or more.

For best results the carbon electrode tubes should be wet-proofed. This can be achieved by immersing the tubes in a 1.5 percent paraffin petroleum ether solution for about five minutes. Following this the electrodes are air dried by passing air through their center. Wet-proofing affects the polarization of the electrode, but too much wet-proofing is detrimental to electrode life since it permits accumulation of hydrogen peroxide which accelerates carbon oxidation, and in some cases destroys the wet-proofing agent (for example, paraffin can be oxidized to fatty acids by nascent oxygen in the presence of heavy metal catalysts). As an additional wet-proofing, a mixture of equal parts of nitro-benzene and kerosene is applied to the inside of the tubular carbon electrode. The very dense inner surface of the electrode does not take up an appreciable amount in a short time. However, the vapors of the compounds mentioned travel to the active outer surface, and are adsorbed there to give the desired degree of repellency.

Other wet-proofing agents can be used in addition to paraffin and petroleum ether. Thus chloronaphthalene and dibenzylether may be used.

*Anode construction*

To achieve the highest possible capacity in a given volume, a powder zinc anode is used. Thirty percent of the zinc particles in this powder should be between 20 and 30 mesh (Tyler) in size; 30 percent between 60 and 100 mesh; another 30 percent should be between 100 and 200 mesh, and the rest is through 200 mesh. This powder is first coated with sodium carboxymethyl cellulose in such a way that a zinc powder carboxymethyl cellulose-water gel is formed. The gel is pressed into thin rods, dried and crushed to a particle size of 12 to 20 mesh. This material is coarse enough to allow the electrolyte to penetrate between the particles. During activation with electrolyte, the carboxymethyl cellulose coating swells, and forms a homogeneous gel anode.

The zinc powder should be amalgamated with from 2 to 4 percent of mercury. Amalgamation is best carried out in a 5 percent ammonia solution by adding the necessary amount of mercury to zinc powder. Vigorous stirring facilitates fast and uniform amalgamation. Amalgamated zinc powder is then washed once or twice with water, and dried in a vacuum at a moderate temperature (40 to 50° C.).

*Electrolyte*

Potassium hydroxide is the preferred electrolyte for the cells of the invention, especially in respect to low temperature service. Nine normal potassium hydroxide solution was found superior to six normal solution for such application.

*Separator*

Suitable separator materials include copolymers of vinyl chloride and acrilonitrile, parchment paper, caustic-resistant cellophane and synthetic fibrous material consisting of vinyl chloride-vinyl acetate copolymer.

*Cell containers*

Polystyrene, methyl methacrylate and similar plastic materials are most suitable as cell containers. Steel cans can be used if properly coated with highly amalgamated zinc. Copper or tin coated steel cans also need pre-amalgamation to stop gassing in contact with zinc. However, magnesium cans can be used as cell containers without pre-amalgamation of any sort. For best results a plastic seal should be placed on top of the cell to prevent moisture from entering the same. Suitably such seals may be of the type disclosed and claimed in the co-pending application of P. A. Marsal, Serial No. 409,435, filed February 10, 1954, now Patent No. 2,759,038.

As shown on Fig. 1, the cell of the invention comprises a plastic container 10 closed at its bottom by a closure 38 of epoxy material having a central opening 36 and a central recess in which fits the bottom of cathode 12. Separating cathode 12 from anode mix 22, which consists of zinc gel coated with sodium carboxymethyl cellulose, and a few milliliters of electrolyte containing 0.1 percent of octyl alcohol, is a multiply separator 40. This separator consists of two outer plies of alkali-absorbent resinous copolymers of vinyl chloride and acrilonitrile, containing about 60 percent of vinyl chloride in the polymer, or parchment paper, surrounding a middle ply of alkali-resistant cellophane. A wire spiral 26 of copper or other metal surrounds the anode, as shown, and passes through the sides of container 10 to serve as the anode collector 48. Surmounting the anode mix, but preferably out of contact therewith is a layer of electrolyte-impervious, foamed polystyrene material 42. A metallic contact 48 is punched on the bottom seal in contact with the wire spiral 26. Positioned a short distance over layer 42 is a top seal of epoxy material having two venting holes 44 and 46. As indicated, this seal has a central opening of a diameter sufficient to permit passage of the cathode. It should be noted from Fig. 1 that the top of the cathode extends above the top of container 10. The reason for this is to make mechanical contact with the bottom of the next cell in a series application. This can be further ensured by placing an apertured thin metal contactor 35 across the opening. A cap 14 surrounds the top of the cathode.

Fig. 2 illustrates the performance of a "D" size cell of the invention which weighs 100 grams. Its high output and voltage levels make it particularly attractive.

It has been determined that "F" size cells of the type will carry a load of 500 ma. and have a capacity of 30 ampere hours. "G" size cells of the same construction will produce 750 ma. and have a capacity of 50 ampere hours.

What is claimed is:

1. An air-depolarized cell comprising, in combination, a container open at both ends, and in said container centrally apertured top and bottom closure members, said top closure having venting means, a tubular cathode composed of carbon having in the pores and at the surface thereof a depolarizing catalyst selected from the group of at least one heavy metal oxide and spinels consisting of an oxide of a heavy metal and of aluminum oxide, said cathode extending above the top of said cell container; gelled anodic material admixed with electrolyte in contact with said bottom closure, with the side walls of said container, and with separator means between said cathode and said anodic material, conductor means surrounding said anode material and passing through the bottom closure of said container to serve as the anode collector for such cell, and sealing means above said anodic material surrounding said cell, at a predetermined distance below said top closure member.

2. The cell of claim 1 wherein said anode gel consists of amalgamated zinc powder coated with sodium carboxymethyl cellulose.

3. A cell according to claim 1 wherein said cathode has a spinel of the formula $CoO \cdot Al_2O_3$ within the pores and at the surface thereof.

4. A cell according to claim 1 wherein said container consists of plastic.

5. A cell according to claim 1 wherein said container consists of steel coated with amalgamated zinc.

6. A cell according to claim 1 wherein said container consists of copper-coated steel.

7. A cell according to claim 1 wherein said container consists of tin-coated steel.

8. A cell according to claim 1 wherein said container consists of magnesium.

9. The cell of claim 1 wherein said conductor means consist of a spiral of copper wire.

References Cited in the file of this patent

UNITED STATES PATENTS

| | | |
|---|---|---|
| 2,097,077 | Oppenheim | Oct. 26, 1937 |
| 2,615,932 | Marke et al. | Oct. 28, 1952 |